Nov. 10, 1964 W. STRIEN ETAL 3,156,004
HINGE FITTINGS FOR SEATS WITH ADJUSTABLE BACK RESTS
Filed Dec. 4, 1962 3 Sheets-Sheet 1
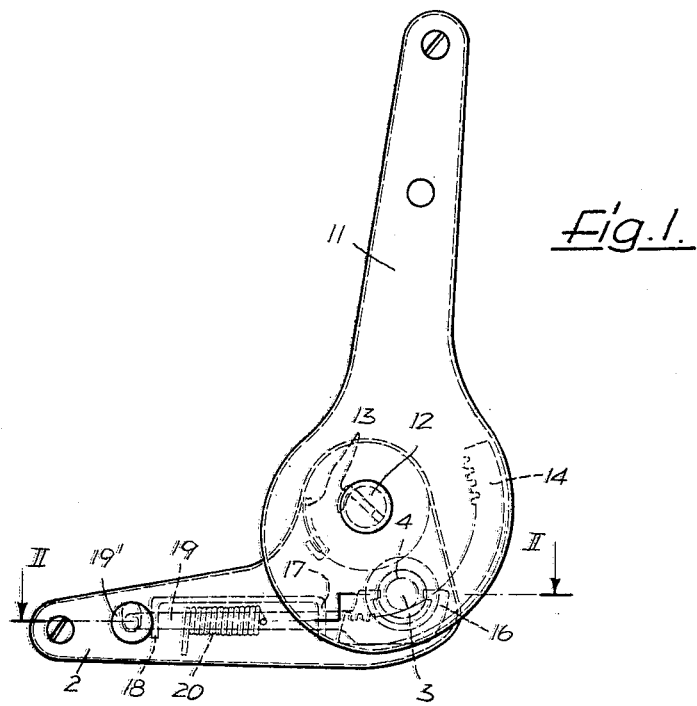
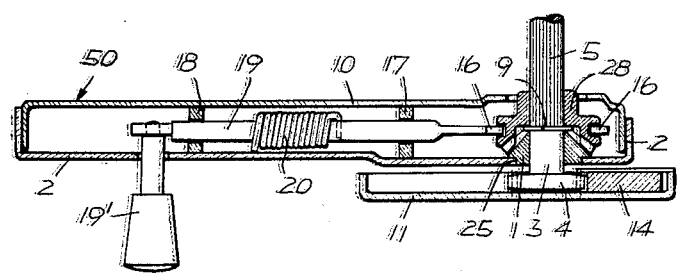
INVENTORS

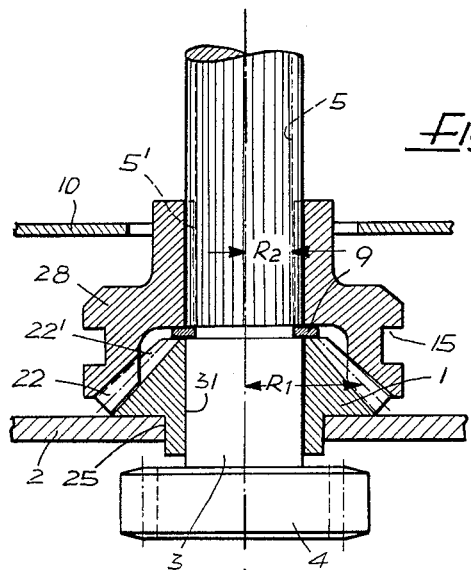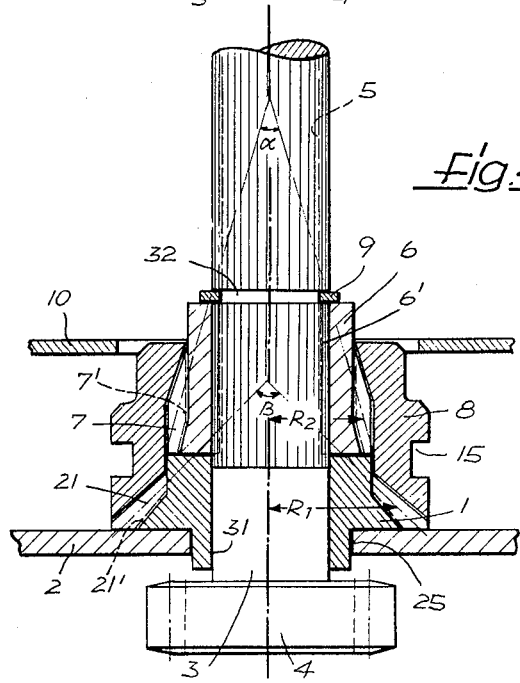

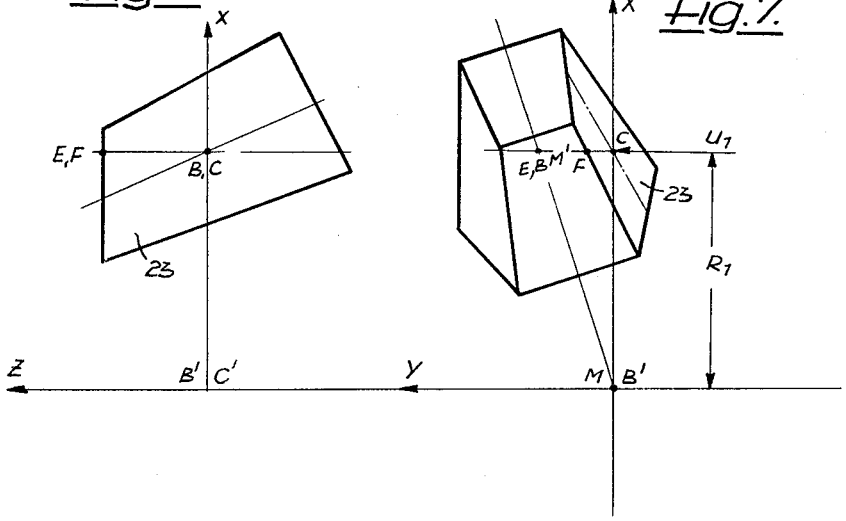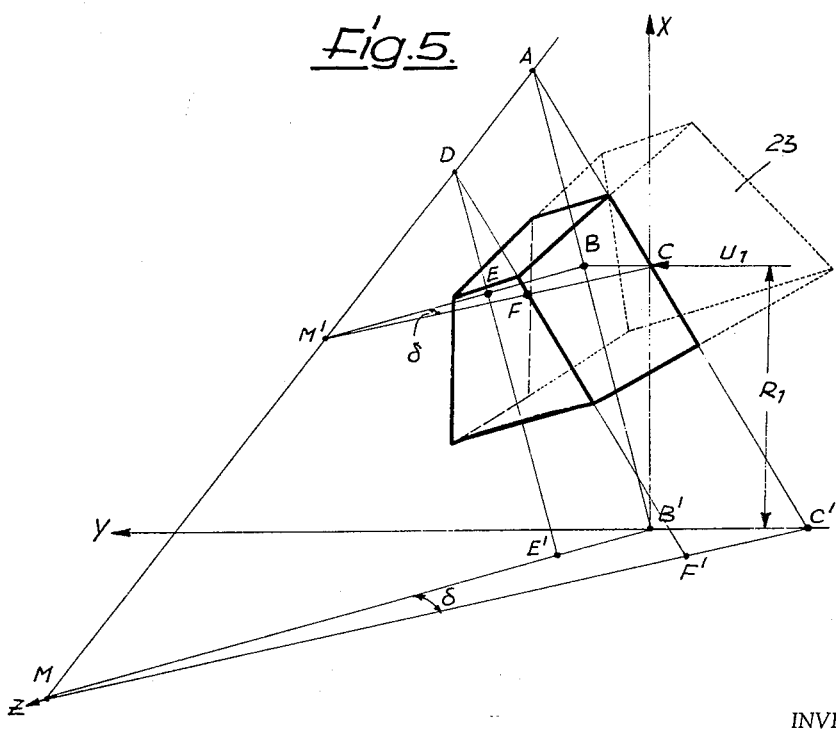

United States Patent Office
3,156,004
Patented Nov. 10, 1964

3,156,004
HINGE FITTINGS FOR SEATS WITH ADJUSTABLE BACK RESTS
Werner Strien, Stuttgart-Weilimdorf, and Jörg Resag, Stuttgart-Vaihingen, Germany, assignors to Recaro A.G., Glarus, Switzerland, a corporation of Switzerland
Filed Dec. 4, 1962, Ser. No. 242,263
Claims priority, application Germany, Dec. 7, 1961, St 18,654
5 Claims. (Cl. 16—146)

The present invention relates to hinge fittings for seats with adjustable back rests, especially for motor vehicles. Such hinge fittings are generally provided in pairs and one hinge fitting of each pair is mounted on each side of the seat and back rest. Each hinge fitting comprises two hinge members, one of which is connected to the seat and the other to the back rest and both of which are pivotably connected to each other and provided with a pair of locking members for locking them in an adjusted position to each other.

More particularly, the invention relates to a hinge fitting which is provided with a pair of coaxial locking members with noncylindrical sets of teeth, one of which members may be moved independently of the associated hinge member in the axial direction and be locked in a fixed position in such a manner that the teeth of the locking members will be in engagement with or disengaged from each other.

Contrary to locking members with sets of cylindrical or spur gear teeth, those with noncylindrical sets of teeth may be engaged with or disengaged from each other without effort or difficulties even while the back rest is acted upon by a force which tends to pivot it. If the locking members have noncylindrical sets of teeth, such a peripheral force acting indirectly upon the tooth flanks which extend obliquely to the axis of the locking members produces an axial force which tends to disengage the locking members from each other. When employing such locking members, it is therefore conventional to provide additional locking means, for example, in the form of an additional self-locking screw thread, to prevent such an undesirable axial movement. The need for such additional securing means constitutes a disadvantage of the known hinge fittings with locking members with noncylindrical sets of teeth.

It is an object of the present invention to provide a hinge fitting of the type as mentioned above in which the locking members have noncylindrical sets of teeth, and particularly bevel-gear teeth, which are designed so as not to require any additional means for securing the locking members from being accidentally or unintentionally disengaged from each other as the result of an axial force which may be produced by a load acting upon the back rest.

Another object of the invention is to satisfy the condition that the sum of all peripheral forces which are produced by a load upon the back rest and act upon the axially movable locking member with the tendency to disengage the locking members from each other should not be greater than the sum of all frictional forces which are produced by the peripheral forces and which oppose such an axial movement.

A further object of the invention is to take into consideration not only the forces occurring between the two locking members as such, but also the forces occurring between the axially movable locking members and its guiding means, as well as any other possible forces which are derived from the peripheral force and might act through other structural parts upon the axially movable locking member.

A further object of the invention is to coordinate the forces with each other in such a manner that the difference between the frictional forces which oppose a disengagement of the locking teeth and the axial forces which tend to effect such a disengagement is relatively small so that in accordance with this difference only a small force will be required to disengage the axially movable locking member from the other locking member. The size of the axial forces which are occurring depends upon the shape of the interengaging teeth of the locking members and the design of the means for securing the axially movable locking member against rotation relative to the associated hinge member.

It has been found according to the invention that the requirements which have to be made upon a hinge fitting of the mentioned type may be fulfilled if the hinge fitting is designed as follows:

The hinge fitting according to the invention comprises a first hinge member which may be secured to one side of the back rest, a second hinge member which may be secured to the same side of the seat and which is pivotably connected to the first hinge member, a first conical locking member which is nonrotatably mounted in the second hinge member and is provided with a first set of bevel gear teeth, and a shaft which is mounted in the first locking member and provided on its peripheral surface with a second set of teeth. The hinge fitting further comprises a second locking member which is movable in the axial direction along the shaft and provided in a bore thereof with a third set of teeth which are in engagement with the second set of teeth on the shaft so that the second locking member is nonrotatably mounted on the shaft, an internal cone in this second locking member which is provided with a fourth set of teeth which are adapted when the second locking member is shifted in the axial direction to engage with or disengage from the first set of teeth of the first locking member, and wherein the first set of teeth of the first locking member and the fourth set of teeth of the second locking memebr are designed of such a shape that the plane of each of their tooth flanks is inclined relative to the axis of the shaft at an angle of less than $$\delta = \text{arc tg} \frac{\mu_1 + \frac{R_1}{R_2} \cdot \mu_2 - \text{tg } \epsilon \left(\frac{R_1}{R_2} - \mu_1 \mu_2\right)}{1 - \frac{R_1}{R_2}/\mu_1\mu_2 + \text{tg } \epsilon \left(\mu_2 + \mu_1 \frac{R_1}{R_2}\right)}$$

In this formula $\mu_1$ represents the coefficient of friction of the tooth flanks of the interengaging first and fourth sets of teeth of the first and second locking members, respectively; $\mu_2$ represents the coefficient of friction of the interengaging second and third sets of teeth of the second locking member and the shaft, respectively; $R_1$ represents the radius of the pitch circle extending centrally between the ends of the tooth flanks of the interengaging first and fourth sets of teeth of the first and second locking member, respectively; and $R_2$ represents the radius of the pitch circle extending centrally between the ends of the tooth flanks of the interengaging second and third sets of teeth of the first locking member and the shaft, respectively.

Furthermore, according to the invention, the angle of taper $\beta$ of the first and fourth sets of teeth is greater than the angle of taper $\alpha$ of the second and third sets of teeth.

The hinge fitting according to the invention is further provided with means for connecting the shaft to the first hinge member, means for securing the shaft against axial displacement, means for shifting the second locking member in the axial direction to a first position, in which the teeth of the first locking member are in engagement with the teeth of the second locking member and thus prevent a pivoting movement of the hinge members relative to each other, and to a second position, in which these teeth are disengaged from each other and thus no longer produce any locking effect.

If the locking members are designed in this manner, the result will also be attained that the locking members can take up a distortion of the side members of the frame of the back rest from a plane which extends parallel to the plane of the side members of the frame of the seat.

A further object of the invention is to design the means for preventing a rotation of the axially movable locking member relative to the shaft carrying the same in such a manner that these means are also suitable for being applied to a shaft of a small diameter which cannot be locked in any other simple manner, for example, by splining.

This object may be attained according to the invention by connecting the shaft and the second axially movable locking member with each other not by bevel-gear teeth, but by serrations, that is, by a cylindrical set of teeth which have a relatively small profile, so that the outer surface of the shaft and the associated inner surface of the bore in the second locking member are similarly corrugated or knurled.

In this case the angle of taper $\alpha$ of the second set of teeth on the shaft and of the third of teeth on the second locking member is equal to zero since they have a cylindrical shape. If in the above-mentioned formula for the angle $\delta$ the angle $\epsilon$ is likewise equal to zero, those parts which contain the factor tg $\epsilon$ will also be equal to zero.

The above-mentioned as well as additional features and advantages of the present invention will become more clearly apparent from the following detailed description thereof which is to be read with reference to the accompanying drawings of two different embodiments of the invention which, although preferred, are not to be regarded as limiting the scope of the invention.

In these drawings,

FIGURE 1 shows a side view of a hinge fitting according to the invention;

FIGURE 2 shows a cross section which is taken along line II—II of FIGURE 1;

FIGURE 3 shows an enlarged detail view of a part of the hinge fitting as shown in FIGURE 2;

FIGURE 4 shows a view similar to FIGURE 3 of a modification of the invention;

FIGURE 5 shows a diagrammatic perspective view of one of the bevel-gear teeth as illustrated in the previous drawings;

FIGURE 6 shows a side view of a tooth according to FIGURE 5, as seen in a direction transverse to the axis of the cone; while FIGURE 7 shows a plan view of a tooth according to FIGURE 5, as seen in the axial direction of the bevel gear.

Referring first particularly to FIGURES 1 to 4, the first member 11 of the hinge fitting according to the invention is adapted to be secured in a suitable manner to one side of the back rest of a seat (both of which are not shown), while the second hinge member 50 of this fitting which consists of two dished casing parts 2 and 10 is pivotably connected to the first hinge member 11 by means of a pivot 12, and it is secured in a suitable manner at the same side as the hinge member 11 but on a part of the seat. If desired, and as only partly indicated in FIGURE 1, the hinge unit may also be provided with a retracting spring 13 which is connected at one end to the first hinge member 11 and at its other end to the second hinge member 50 and tends to pivot the first hinge member 11 in a counterclockwise direction, as seen in FIGURE 1.

The casing part 2 which forms the outer side of the second hinge member 50 is provided with a bore 25 which is disposed eccentrically to pivot 12 and has a first locking member 1 rigidly secured therein. This first locking member 1 has a bore 31 coaxially thereto and is provided with a first set of bevel gear teeth 21 on its conical outer surface, the theoretical apex of which faces in the direction toward the seat. Bore 31 has rotatably mounted therein a shaft 3, the projecting part of which extending toward the seat is provided with outer serrations or corrugations 5. Directly adjacent to the first locking member 1, a bushing 6 which is provided with corresponding inner serrations 6' is splined on the serrated part 5 of shaft 3 so as to be nonrotatably connected thereto, and by means of a spring ring 9 which engages into a groove 32 in shaft 3, bushing 6 is also locked in the axial direction to shaft 3. Bushing 6 and shaft 3 may, however, also be integral with each other. On its outer peripheral surface, bushing 6 is provided with a second set of beveled teeth 7 which are disposed at an angle of taper $\alpha$ to each other.

A second locking member 8 which is fitted over and slidable in the axial direction on bushing 6 is provided on the wall of its axial bore with a third set of beveled internal teeth 7' which are tapered in accordance with the external teeth 7 on bushing 6 and in engagement with these teeth 7 so that this second locking member 8 is nonrotatably connected to bushing 6 but slidable thereon in the axial direction. The end of the second locking member 8 facing the first locking member 1 is conical on the inside and provided with a fourth set of beveled internal teeth 21' which are tapered at an angle $\beta$ to each other in accordance with the external teeth 21 on the first locking member 1. The angle of taper $\beta$ of teeth 21 and 21' is greater than the angle of taper $\alpha$ of teeth 7 and 7'.

The first set of teeth 21 on the first locking member 1 and the fourth set of teeth 21' on the second locking member 8 are designed so that the planes of their tooth flanks are inclined relative to the axis of shaft 3 at a minimum angle of $$\delta = \text{arc tg} \frac{\mu_1 + \frac{R_1}{R_2}\mu_2 - \text{tg } \epsilon\left(\frac{R_1}{R_2} - \mu_1\mu_2\right)}{\mu_1 - \frac{R_1}{R_2}\mu_1\mu_2 + \text{tg } \epsilon\left(\mu_2 + \mu_1\frac{R_1}{R_2}\right)}$$

The second set of teeth 7 on shaft 3 and the third set of teeth 7' on the second locking member 8 are designed so that the planes of their tooth flanks are inclined relative to the axis of shaft 3 at an angle of less than $$\epsilon = \text{arc tg} \frac{\mu_1 + \frac{R_1}{R_2}\cdot\mu_2}{\frac{R_1}{R_2} - \mu_1\mu_2}$$

In these equations, $\mu_1$ represents the coefficient of friction of the tooth flanks of the interengaging first and fourth sets of teeth 21 and 21' of the first and second locking member 1 and 8, respectively; $\mu_2$ represents the coefficient of friction of the interengaging second and third sets of teeth 7 and 7' on shaft 3 and the second locking member 8, respectively; $R_1$ represents the radius of the pitch circle of the interengaging first and fourth sets of teeth 21 and 21', respectively, which extends centrally between the ends of these teeth flanks; and $R_2$ represents the radius of the pitch circle of the interengaging second and third sets of teeth 7 and 7', respectively, which extends centrally between the ends of the flanks of these teeth. The meaning of these two formulas will be subsequently described.

The end of shaft 3 facing the first hinge member 11 has a spur gear 4 rigidly secured thereto which meshes with a segmental rack 14 with internal teeth which extends coaxially to shaft 12 and is rigidly secured to the first hinge member 11. Gear 4 and rack 14 merely serve as means for transmitting the rotary movement of the hinge member 11 for the back rest to the second locking member 8 in FIGURE 4 or 28 in FIGURES 2 and 3. Shaft 3 of the hinge fitting which is secured to one side of the seat may be nonrotatably connected to the corresponding shaft of the hinge fitting (not shown) at the other side of the seat or the two shafts may be integral with each other. In the latter case, only one of the hinge fittings has to be provided with the device as subsequently described for operating the axially movable second locking member 8. However, the two axially movable locking members of the two hinge fittings must then be connected to each other in a manner so as to be movable in the same direction. If the two hinge fittings of one seat are symmetrical to each other, this means that the two axially movable second locking members of both hinge fittings must be movable in opposite directions to each other which may be carried out by conventional means.

Hinge member 50 contains a rod 19 which is rotatably mounted in bearings 17 and 18, and the axis of the rod 19 crosses the axis of the shaft 3 at a right angle. One end of the rod 19 includes a bifurcated portion, a locking member engaging portion extending vertically normal to the one end of the rod 19 and having a pair of fingers 16 pointing toward each other along a common axis which is parallel to the longitudinal axis of the rod 19. The fingers 16 engage diametrically an annular groove 15 of the axially movable second locking member 8. By means of a handle 19' extending normal to the other end of rod 19, the latter may be turned about its axis whereby the bifurcated portion will be pivoted and the second locking member 8 will be shifted in the axial direction and thus be engaged with or disengaged from the first locking member 1. During this movement of locking member 8, the second and third sets of teeth 7 and 7' remain continuously in engagement with each other. A torsion spring 20, one end of which is connected to rod 19 and the other end of which rests against the casing part 2, tends to shift the second locking member 8 into its engaged position from which it may be disengaged by pulling the handle 19' upwardly. When handle 19 is released, the axially movable locking member 8 immediately reengages. The axial movement of locking member 8 is limited by its engagement with the casing part 10 of the second hinge member 50.

When the second locking member 8 is disengaged, the first hinge member 11 can be pivoted about its axis 12. By this pivoting movement, gear 4 rolls along the segmental rack 14 and thereby rotates the shaft 3 which, in turn, rotates the second locking member 8 relative to the first locking member 1. A pivoting movement of the first hinge member 11 is therefore possible only if the first locking member 1 and the second locking member 8 are disengaged from each other.

According to the modification of the invention, as illustrated in FIGURES 2 and 3, the second locking member 28 is mounted directly, that is, without any intermediate bushing, on the corrugated or serrated part 5 of shaft 3 which is mounted in the same manner as in the first embodiment according to FIGURE 4 so as not to be movable in its axial direction within the first locking member 1. The wall of the second locking member 28 is provided with inner corrugations or serrations which form the third set of teeth 5' and are in axially slidable engagement with the second set of teeth 5 which are formed by the serrations on shaft 3. The planes of the flanks of the second and third sets of teeth 5 and 5' extend parallel to the axis of shaft 3 so that the angles $\alpha$ and $\epsilon$ are equal to zero, while the planes of the flanks of the third set of teeth 22 of the second locking member 28 and of the first set of teeth 22' of the first locking member 1 may be inclined to the axis of shaft 3 at a maximum angle of $$\delta' = \text{arc tg} \frac{\mu_1 + \frac{R_1}{R_2} \cdot \mu_2}{1 - \frac{R_1}{R_2} \cdot \mu_1 \mu_2}$$

This angle $\delta'$ results from the formula for the angle $\delta$ as previously mentioned if the angle $\epsilon$ in this formula is equal to zero.

The limiting value of the angle $\delta$ of the tooth flanks of the first set of teeth 21 and the fourth set of teeth 21' and the limiting value of the angle $\epsilon$ of the second set of teeth 7 and the third set of teeth 7' result from the axial forces occurring in the second locking member 8. FIGURES 5, 6, and 7 illustrate a tooth which may be one of the teeth of the first locking member 1 or of the bushing 6. These drawings also show a three-dimensional rectangular system of coordinates, the zero point of which lies on the axial axis of the first locking member and Z-axis of which is identical with the axis of the first locking member. The $x$—$y$ plane intersects the tooth at the point C on a flank of the tooth.

The force acting upon a tooth flank when a load is exerted upon the back rest may be represented by a force $U_1$ which engages at the point C of the tooth flank 23 and acts in a direction parallel to the Y-axis. The plane of this tooth flank 23 intersects the YZ-plane within the line MC'. Since the Z-axis of the system of coordinates lies in FIGURES 5 to 7 within the axis of the locking member with which the tooth as illustrated is associated, the angle E'MC' forms the angle of inclination $\delta$ of the plane of the tooth flank 23 relative to the axis. Therefore, the axial component of the force $U_1$ is:

$$U_{a_1} = U_1 \cdot \text{tg } \delta$$

The axial component of the frictional force produced by $U_1$ is:

$$R_{a_1} = U_1 \cdot \text{tg } \rho_1$$

The second locking member 8 is acted upon by the difference of these two axial forces:

$$P_{a_1} = U_1 \cdot \text{tg } (\delta - \rho_1) = \frac{M}{R_1} \cdot \text{tg } (\delta - \rho_1)$$

In this formula M represents the torque which is produced by the load upon the back rest. Accordingly, the axial forces acting as the result of this torque upon the tooth flanks of the second and third sets of teeth 7 and 7' are:

$$U_{a_2} = U_2 \cdot \text{tg } \epsilon \text{ and } R_{a_2} = U_2 \cdot \text{tg } \rho_2$$

The excess in frictional force is therefore:

$$P_{a_2} = U_2 \cdot \text{tg } (\rho_2 - \epsilon) = \frac{M}{R_2} \text{tg } (\rho_2 - \epsilon)$$

In order to prevent the locking member 8 from disengaging as a result of a load upon the back rest, the difference $P_{a_1}$ between the two axial forces must not be greater than the excessive frictional force $P_{a_2}$. In the boundary case in which both forces are equal, the formula applies:

$$\frac{M}{R_1} \cdot \text{tg } (\delta - \rho_1) = \frac{M}{R_2} \cdot \text{tg } (\rho_2 - \epsilon)$$

If tg $\rho_1$ is equal to $\mu_1$ and tg $\rho_2$ is equal to $\mu_2$, it will result in:

$$\delta = \text{arc tg} \frac{\mu_1 + \frac{R_1}{R_2} \cdot \mu_2 - \text{tg } \epsilon \left(\frac{R_1}{R_2} - \mu_1 \mu_2\right)}{1 - \frac{R_1}{R_2} \cdot \mu_1 \mu_2 + \text{tg } \epsilon \left(\mu_2 + \mu_1 \frac{R_1}{R_2}\right)}$$

The requirement that the angle $\delta$ must be greater than zero results in the limiting condition for the angle $\epsilon$:

$$\epsilon = \text{arc tg} \frac{\mu_1 + \frac{R_1}{R_2} \cdot \mu_2}{\frac{R_1}{R_2} - \mu_1 \cdot \mu_2}$$

FIGURES 1 and 2 of the drawings illustrate that shaft 3 which carries the second locking member 8 is disposed eccentrically to the pivoting axis 12 of the hinge fitting. Naturally, it is possible that shaft 3 is identical with the axis 12 of the hinge fitting. In this case, gear wheel 4 and the segmental rack 14 are omitted.

Although our invention has been illustrated and described with reference to the preferred embodiments thereof, we wish to have it understood that it is in no way limited to the details of such embodiments, but is capable of numerous modifications within the scope of the appended claims.

We claim:

1. A hinge fitting for a seat with an adjustable back rest, especially for motor vehicles, comprising a first hinge member adapted to be secured to one side of the back rest, a second hinge member adapted to be secured to the same side of the seat and including a pair of members adapted to be connected to each other to form a casing, said first and second hinge members being pivotably connected to each other, a first conical locking member nonrotatably mounted in said second hinge member and having a first set of teeth on the conical part thereof, a shaft rotatably mounted in said first locking member and having on its periphery a second set of teeth, a tubular second locking member mounted on said shaft so as to be movable in the axial direction thereof and having on the wall of its bore a third set of teeth engaging with said second set of teeth on said shaft so that said second locking member is nonrotatably mounted on said shaft, said second locking member having an inner conical surface provided with a fourth set of teeth adapted when said second locking member is shifted in the axial direction to engage with or disengage from said first set of teeth on said first locking member, said first set of teeth on said first locking member and said fourth set of teeth on said second locking member having such a shape that the plane of each of their tooth flanks is inclined relative to the axis of said shaft at a maximum angle of $$\delta = \text{arc tg} \frac{\mu_1 + \frac{R_1}{R_2}\mu_2 - \text{tg } \epsilon \left(\frac{R_1}{R_2} - \mu\mu_2\right)}{1 - \frac{R_1}{R_2}\cdot\mu_1\mu_2 + \text{tg } \epsilon \left(\mu_2 + \mu_1\frac{R_1}{R_2}\right)}$$

said second set of teeth on said shaft and said third set of teeth on said second locking member having such a shape that the plane of each of their flanks is inclined relative to the axis of said shaft at an angle of less than $$\epsilon = \text{arc tg} \frac{\mu_1 + \frac{R_1}{R_2}\cdot\mu_2}{\frac{R_1}{R_2} - \mu_1\cdot\mu_2}$$

wherein $\mu_1$ represents the coefficient of friction of the tooth flanks of the interengaging first and fourth sets of teeth on said first and second locking member, respectively, $\mu_2$ represents the coefficient of friction of the interengaging second and third sets of teeth on said second locking member and said shaft, respectively, $R_1$ represents the radius of the pitch circle extending centrally between the ends of the tooth flanks of the interengaging first and fourth sets of teeth on said first and second locking member, respectively, and $R_2$ represents the radius of the pitch circle extending centrally between the ends of the tooth flanks of the interengaging second and third sets of teeth on said first locking member and said shaft, respectively, the angle of taper $\beta$ of said first and fourth sets of teeth being greater than the angle of taper $\alpha$ of said second and third sets of teeth; further comprising means for connecting said shaft to said first hinge member, means for securing said shaft against movement in its axial direction, means for shifting said second locking member in the axial direction to a fixed position in which the teeth on said first locking member are in engagement with the teeth on said second locking member and thereby prevent a pivoting movement of said hinge members relative to each other, and to a second position, in which these teeth are disengaged from each other and thus no longer produce any locking effect.

2. A hinge fitting as defined in claim 1, in which the planes of the flanks of said second set of teeth on said shaft and of said third set of teeth on said second locking member extend parallel to the axis of said shaft so that the angles $\alpha$ and $\epsilon$ are equal to zero.

3. A hinge fitting as defined in claim 2, in which said second set of teeth on said shaft and said third set of teeth on said second locking member form projections on the peripheral surface of said shaft and extending parallel to the axis thereof, said projections being separated by recesses so that said projections on said shaft engage into said recesses in said second locking member and said projections on said second locking member engage into said recesses in said shaft.

4. A hinge fitting as defined in claim 1, in which a bushing is rigidly secured to said shaft between said shaft and said second locking member and carries said second set of teeth on the periphery thereof.

5. A hinge fitting as defined in claim 1, in which said means for connecting said shaft to said first hinge member include a gear wheel secured to said shaft, and a segmental rack secured to said first hinge member and extending concentrically to the pivot axis of said first hinge member and meshing with said gear wheel.

References Cited by the Examiner

UNITED STATES PATENTS 2,485,015 10/49 Radtke _____ 16—146 X
3,099,485 7/63 Beierbach et al. _____ 16—146 X

FOREIGN PATENTS 510,360 1/55 Italy.

DONLEY J. STOCKING, *Primary Examiner.*